(12) United States Patent
Fischer

(10) Patent No.: US 9,896,057 B2
(45) Date of Patent: Feb. 20, 2018

(54) METHOD FOR FOLDING AN AIRBAG AND AIRBAG

(71) Applicant: TRW AUTOMOTIVE GMBH, Alfdorf (DE)

(72) Inventor: Anton Fischer, Schechingen-Leinweller (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/898,843

(22) PCT Filed: Jun. 26, 2014

(86) PCT No.: PCT/EP2014/001747
§ 371 (c)(1),
(2) Date: Dec. 16, 2015

(87) PCT Pub. No.: WO2015/000567
PCT Pub. Date: Jan. 8, 2015

(65) Prior Publication Data
US 2016/0114753 A1    Apr. 28, 2016

(30) Foreign Application Priority Data

Jul. 4, 2013   (DE) .................. 10 2013 011 154

(51) Int. Cl.
*B60R 21/237*   (2006.01)
*B60R 21/201*   (2011.01)
*B60R 21/231*   (2011.01)

(52) U.S. Cl.
CPC .......... *B60R 21/237* (2013.01); *B60R 21/201* (2013.01); *B60R 21/23138* (2013.01)

(58) Field of Classification Search
CPC ................ B60R 21/237; B60R 21/201; B60R 21/23138
See application file for complete search history.

(56) References Cited

U.S. PATENT DOCUMENTS

| | | | | |
|---|---|---|---|---|
| 5,275,435 A * | 1/1994 | Fischer | ................. | B60R 21/237 280/743.1 |
| 5,360,387 A * | 11/1994 | Baker | ................... | B60R 21/237 280/243 |
| 5,694,737 A * | 12/1997 | Lunt | ..................... | B60R 21/237 53/117 |
| 6,739,622 B2 * | 5/2004 | Halford | ................. | B60R 21/237 280/743.1 |
| 2004/0251669 A1* | 12/2004 | Fischer | ................. | B60R 21/237 280/743.1 |
| 2007/0052225 A1 | 3/2007 | Borje et al. | | |
| 2008/0258442 A1* | 10/2008 | Quach | ................... | B60R 21/201 280/730.2 |

(Continued)

FOREIGN PATENT DOCUMENTS

| | | |
|---|---|---|
| GB | 2400825 | 10/2004 |
| WO | 2011075050 | 6/2011 |

*Primary Examiner* — James A English
(74) *Attorney, Agent, or Firm* — Tarolli, Sundheim, Covell & Tummino LLP

(57) ABSTRACT

A method of folding an airbag (10) includes the following steps: the airbag (10) is flatly spread, a first section (16) adjacent to a first border (14) is folded at least once, the folded first section (16) is folded in U-shape, and a second section (18) adjacent to the first section (16) is rolled around the folded first section (16).

15 Claims, 2 Drawing Sheets

(56) References Cited

U.S. PATENT DOCUMENTS

| | | | |
|---|---|---|---|
| 2009/0134611 A1* | 5/2009 | Wigger | B60R 21/231 280/730.1 |
| 2010/0007121 A1* | 1/2010 | Mendez | B60R 21/237 280/730.2 |
| 2010/0270782 A1 | 10/2010 | Enders et al. | |
| 2012/0013109 A1* | 1/2012 | Fujita | B60R 21/205 280/732 |
| 2012/0267880 A1 | 10/2012 | Frisk et al. | |
| 2015/0375710 A1* | 12/2015 | Sievers | B60R 21/237 280/730.2 |

\* cited by examiner

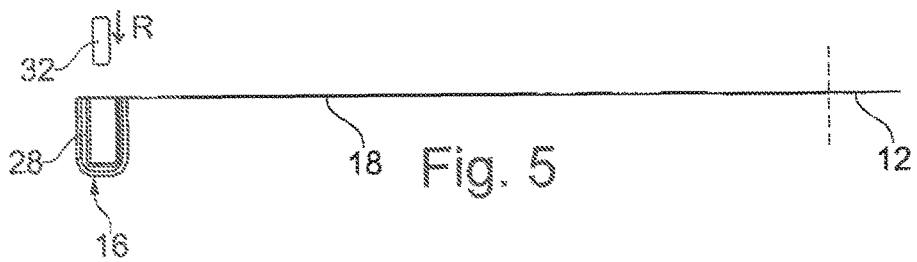
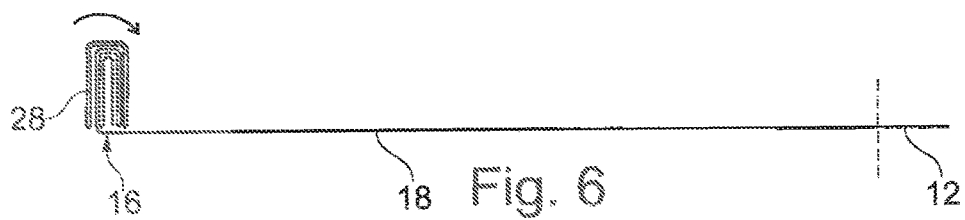
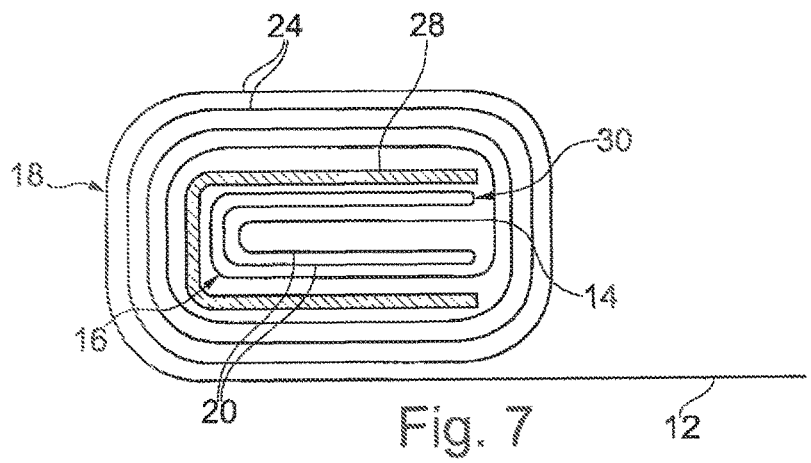
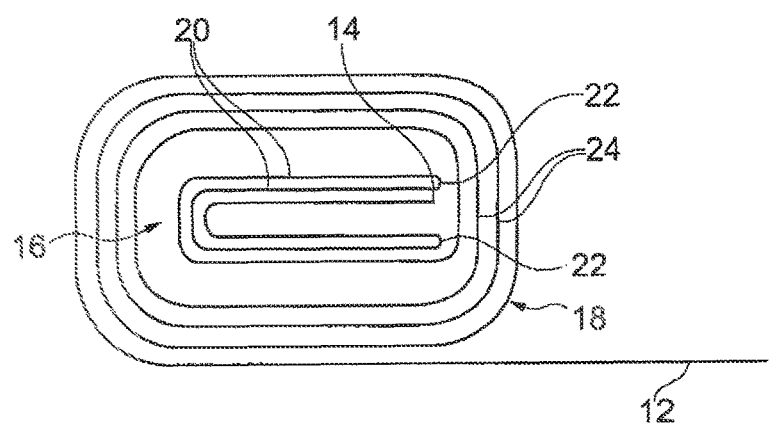

METHOD FOR FOLDING AN AIRBAG AND AIRBAG

RELATED APPLICATIONS

This application corresponds to PCT/EP2014/001747, filed Jun. 26, 2014, which claims the benefit of German Application No. 10 2013 011 154.4, filed Jul. 4, 2013, the subject matter of which are incorporated herein by reference in their entirety.

BACKGROUND OF THE INVENTION

The invention relates to a method of folding an airbag as well as to an airbag consisting of flat fabric.

In order to accommodate airbags in the vehicle behind an interior trim in a space-saving manner, they are folded prior to being mounted in the vehicle. When the airbag is activated, the gas flows into the airbag so that the latter automatically deploys due to the internal pressure. In these airbags the inflation behavior substantially depends on how the airbag is folded. It is a preferred way of folding the airbag to roll up the airbag starting from a border toward an inflating section through which the gas may flow into the airbag.

However it turned out to be a drawback of this method that such rolled-up airbag has a round cross-sectional shape so that a casing having an appropriate mounting depth is required. Depending on the mounting conditions it is desired, however, to obtain a flat airbag package which can be positioned also in areas having small mounting depth between the car body and the interior trim. A mere folding-up of the airbag into the desired shape requires additional fixing of the folded airbag, however, so as to prevent the folded airbag package from deploying or from losing its shape already during assembly, thus impeding insertion into a casing.

SUMMARY OF THE INVENTION

It is the object of the invention to provide a method of folding an airbag by which the airbag can be folded to form a package having small mounting depth, it is a further object of the invention to provide such airbag.

In order to achieve the object a method of folding an airbag is provided comprising the following steps:
the airbag is flatly spread,
a first section adjacent to a first border of the airbag is folded up at least once,
the folded-up first section is folded in U-shape, and
a second section adjacent to the first section is rolled around the folded first section.

By this method first a core having an oval or rectangular cross-section is manufactured from the first section, with the second section of the airbag being subsequently rolled around said core. In this way, an airbag package having an equally oval, oblong or rectangular cross-section is formed, with the lobed airbag thus having a smaller mounting depth. The exact dimensions of the folded airbag can be defined by the dimensions of the folded-up and folded first section. Compared to a loosely wound airbag which is subsequently flattened, this method offers the advantage that a tight rolled airbag package is formed which is held together by the second section wound around the first section. The folded airbag is moreover dimensionally stable so that during mounting only small deformations of the airbag package occur.

The first section can be folded by the following steps, for example:
the airbag is wound around a rolling core especially round in cross-section starting with the first border which is especially opposed to a fastening section,
the rolling core is removed, and
the wound first section is flattened.

The diameter of the rolling core is preferably selected so that the flattened first section exhibits the desired dimensions after folding into U-shape. Initial rolling-up of the airbag in the first section is substantially easier than mere folding of the first section. By subsequently folding the first section in U-shape moreover higher stability is imparted to it. Thus substantially easier folding of the first section is possible. In addition, by selecting en appropriate diameter of the rolling core it is possible to easily adapt the airbag to different cross-sectional shapes. If a flatter airbag is desired, a rolling core having a larger diameter can be used, for example, so that the width of the folded first section is larger, but the height is smaller due to the smaller number of fabric layers.

The U-shaped folding can be carded out, for example, by pressing the folded first section by a folding knife into an oblong slit in the tool and thus folding the same in U-shape. For this purpose, the folded first section is positioned preferably centrally, i.e. with the desired bending area, on the oblong slit. After that, the folding knife enters into the oblong slit, thus pressing the folded first section into said slit. In this way the folded-up first section is folded in U-shape, wherein, due to the central arrangement of the first section above the oblong slit, said section is folded symmetrically together so as to form a U. Preferably the manufacturing step is taken so that the airbag is wound, for example on a plane, until the wound first section is provided above the oblong slit. Then the rolling core is removed and the wound first section is flattened so that it is located centrally above the oblong slit. Hence any complicated positioning of the folded first section above the oblong slit is dispensed with.

Preferably, the oblong slit is provided in an oblong folding strip especially U-shaped in cross-section and the folded first section is introduced into the slit of said folding strip extending in the longitudinal direction and is this folded together in U-shape. Said folding strip can be placed, before folding the airbag, on a surface of the tool, for example in a seat in the surface or, after winding up and flattening the first section, can be positioned on the latter.

In a further method step the second section can be wound around the first section and the folding strip into which the first section is introduced, and the folding strip can be removed after winding up the second section. Due to the folding strip, the section folded together in U-shape reliably retains its shape during the rolling operation of the second section so that the second section can be tightly wound around the first section without the latter losing its cross-sectional shape.

In order to ensure sufficient stability of the folded airbag, the second section is roiled at least once, but preferably at least three times, completely around the first section so that the first section cannot deploy.

In accordance with the invention, moreover an airbag is provided consisting of a flat fabric which is especially folded by a method according to the invention, the airbag including a first section having plural nested fabric layers each of which extends and is folded in U-shape as well as a second section rolled around the first section. The folded first section defines the cross-sectional shape of the airbag. The second section which is rolled around the first section fixes the nested fabric layers so that the airbag cannot deploy during assembly of the airbag or during transport.

In order to ensure sufficient stability of the airbag in the folded condition at least one layer of the second section is rolled completely around the first section.

Preferably, the second section includes at least three fabric layers roiled on top of each other, however, so that increased stability of the folded airbag is obtained.

Equally, the first section may include at least three superimposed fabric layers extending in U-shape. The dimensions as well as the number of said fabric layers may be freely chosen in dependence on the desired dimensions of the folded airbag.

The directly superimposed fabric layers of the first section, each being folded in U-shape, preferably merge at a common border of the U. Said fabric layers may be folded or rolled in a concertina-like manner, for example.

BRIEF DESCRIPTION OF THE DRAWINGS

Further advantages and features are found in the following description in connection with the enclosed drawings in which:

FIG. 5 shows a fourth step of a method according to the invention for folding the airbag from FIG. 1, FIG. 6 shows a fifth step of a method according to the invention for folding the airbag from FIG. 1, FIG. 7 shows a sixth step of a method according to the invention for folding the airbag from FIG. 1, and FIG. 8 shows a seventh step of a method according to the invention for folding the airbag from FIG. 1.

DESCRIPTION

Figure 1:
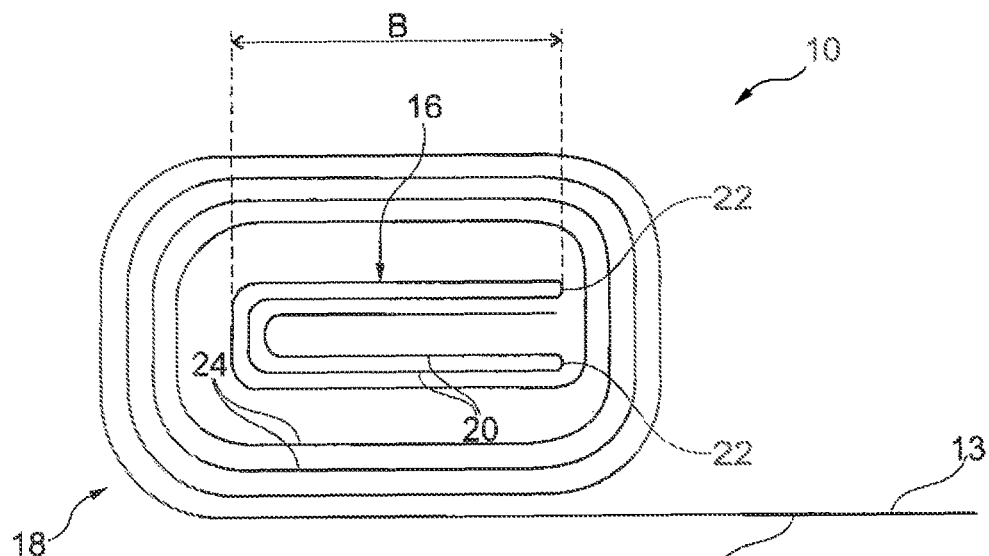
FIG. 1 shows an airbag according to the invention.
Figure 2:
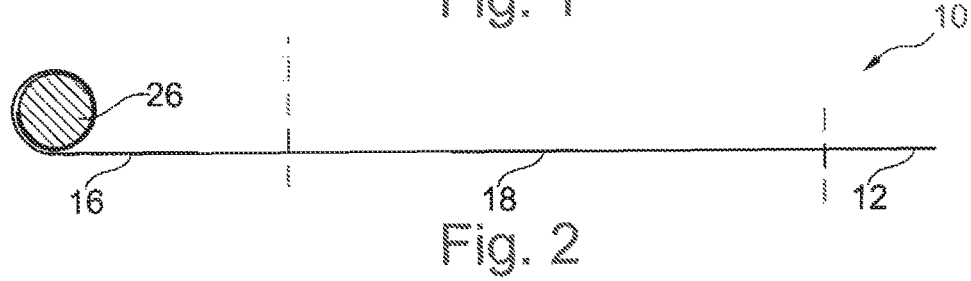
FIG. 2 shows a first step of a method according to the invention for folding the airbag from FIG. 1.

In FIG. 1 a folded airbag 10 is shown. The airbag 10 is a side airbag, for example, which is mounted between the body of the vehicle and a vehicle interior trim in a casing and protects the heads of the front and/or rear occupants.

The airbag 10 is made of flat fabric and includes a fastening section 12 by which the airbag 10 is mounted fixedly to the vehicle and on which an injecting section 13 is provided through which as can flow from an inflator into the airbag 10. Further, the airbag 10 includes a first section 18 starting from a first border 14 which is opposed to the fastening section 12 and a rolled second section 1 located between the first section 16 and the fastening section 12.

The first section 16 includes plural nested fabric layers 20, each being folded in U-shape. In the embodiment shown here the fabric layers 20 are helically wound up. However, it is also possible that the fabric layers 20 are folded in a concertina -type form. The individual fabric layers 20 are merging at the open borders 22 of the U.

The second section 18 adjacent to the first section 16 is roiled around the first section 16, with four fabric layers 24 roiled on top of each other being provided in this embodiment.

Depending on the shape and the size of the airbag 10, the number of the fabric layers 24 of the second section roiled around the first section 16 may vary at will. It is merely required that one fabric layer 24 is roped completely around the first section 16 so that the latter cannot unfold.

Also, the number of the fabric layers 20 of the first section 16 may vary at will, depending on the cross-sectional shape which the folded airbag is intended to have. The width 6 of the fabric layers 20 may also be adapted accordingly.

By the folded first section 16 folded in U-shape oblong or oval cross-section is imparted to the folded airbag 10 also with the second section 18 being roiled around the first section 18. In this way the airbag 10 has a smaller mounting depth so that it may also be mounted in flatter areas between the vehicle body and the interior trim.

The airbag 10 is folded by a method illustrated in FIGS. 2 to 8.

In a first method step (FIG. 2) the airbag 10 is flatly spread on a tool-side surface and the first section 16 is wound around a tool-side roll n core 26 starting from a border 14 opposed to the fastening section 12.

Figure 3:
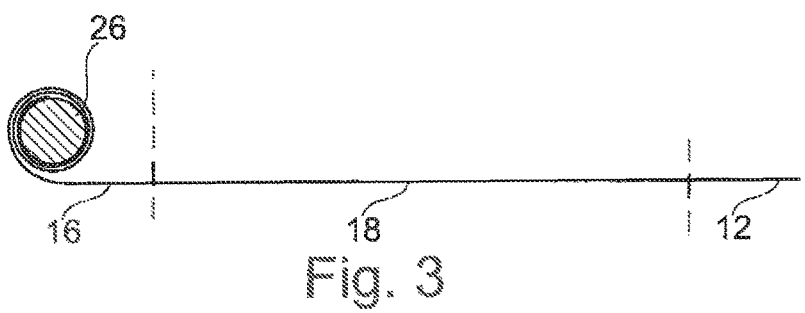
FIG. 3 shows a second step of a method according to the invention for folding the airbag from FIG. 1.
Figure 4:
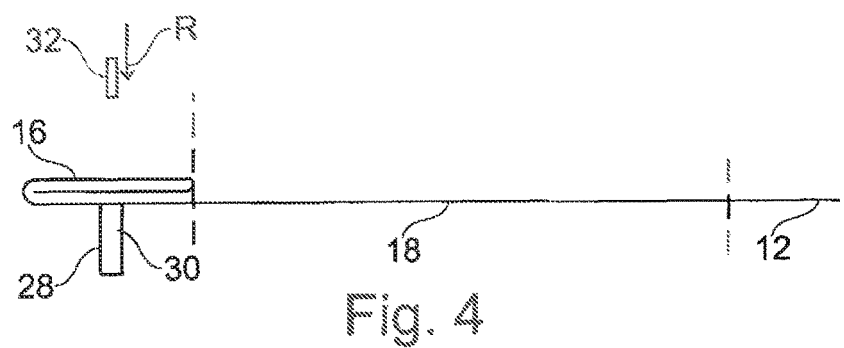
FIG. 4 shows a third step of a method according to the invention for folding the airbag from FIG. 1.

When the first section 16 is completely wound up, the rolling core 26 is removed (axially withdrawn) and the wound first section 16 is flattened (FIGS. 3 and 4).

As is evident from FIG. 4, the wound and flattened first section 16 is positioned centrally above a folding strip 28. The folding strip 28 has a U-shaped cross-section and includes an oblong slit 30 which substantially depicts the shape of the folded first section 16.

The folding strip 28 cannot be positioned beneath the first section 16 before the latter has been wound and flattened. Preferably, the folding strip 28 is positioned in a recess provided in the surface on which the airbag 10 is folded, however, already before winding the first section 16 around the rolling core 26. The recess is selected so that the folding strip does not hinder winding of the first section 16 and is flush with the surface, for example. In this embodiment, the airbag 10 is wound until the raising core 26 is provided centrally above the folding strip 28. By removing the rolling core 26 and subsequently flattening the first section 16, the latter is located centrally above the folding strip 28 and the oblong slit 30.

After that, a folding knife 32 associated with the slit 30 of the folding strip 28 is guided into the slit 30 of the folding strip 28 in an actuating direction R. The folding knife 32 forces the flattened first section 16 into the slit 30 of the folding strip 28 so that the first section 16 is folded in U-shape (FIG. 5). Since the folded-together first section 16 has been positioned centrally above the slit 30, the first section 16 is symmetrically folded.

Then the folding knife 32 is removed from the slit 30 against the actuating direction R, with the first section folded in U-shape is retained in the folding strip 28.

The diameter of the rolling core 26 was selected so that the flattened first section 16 folded together in U-shape has the desired dimensions. By selecting appropriate rolling core 26, it is thus possible to adapt the cross-sectional shape of the folded airbag 10. A rolling core 26 having a larger diameter creates a folded first section folded together in U-shape, for example, which is flatter and wider.

In the next method step the second section 18 is rolled around the first section 16 folded in U-shape (FIGS. 6 and 7). The first section 16 is retained in the folding strip 28 so that the second section 18 is rolled both around the first section 16 and around the folding strip 28.

Since the first section folded in U-shape is still provided in the folding strip 28, the shape of the first section 16 is defined. Thus the first section 16 cannot be deformed, even if the second section 18 is rolled up more tightly around the first section 16, but retains the desired shape having an oblong or oval cross-section.

The second section 18 is completely wound around the first section 16 at least once so that a compact airbag package is formed and the first section 16 cannot unfold. Preferably the second section 18 is rolled around the first section 16 at least three times, however.

When the second section 18 is completely rolled up, in a last method step the folding strip 28 is removed (FIG. 8) and axially withdrawn.

This method provides a rolled airbag 10, wherein, in contrast to a typical rolling method, the cross-section of said airbag 10 is not round but oval, oblong or rectangular. in this way the mounting depth of the folded airbag 10 is smaller so that it can also be inserted into a flatter casing.

In order to obtain this cross-sectional shape of the airbag 10, it is required that the first section is folded together and subsequently folded in U-shape, wherein the cross-sectional shape of the first section 16 folded in U-shape defines the shape of the airbag package. The second section 18 rolled around the first section 16 subsequently serves for fixing the folded fabric layers 20 of the first section 16 so that the airbag 10 cannot deploy prematurely when being assembled in the vehicle.

The first section 16 may also be folded together and subsequently be folded in U-shape by any other method. It is especially possibly that the first section 16 is not rolled up, flattened and than folded in U-shape but is folded in a concertina-type manner, for example, and is subsequently folded in U-shape.

It is not necessary to use a folding strip 28 for folding the first section in U-shape, either. This can also be accomplished, for example, by a simple oblong silt 30 provided in a surface on which the airbag is folded. The first section 16 of the airbag 10 is removed from the slit 30 after U-shaped folding and then the second section 18 is rolled around the former.

The folding strip 28 may also be removed before the second section 18 is roiled around.

The invention claimed is:

1. A method of folding a side airbag (10) which protects the heads of the front and/or rear occupant, having a fastening section by which the side airbag (10) is mounted fixedly to the vehicle and first border (14) comprising the following steps:
   the airbag (10) is flatly spread,
   a first section (16) adjacent to the first border (14) of the airbag (10) is folded, the first section being folded by the steps of winding the airbag with the first border around a rolling core multiple times, removing the rolling core, and flattening the wound first section,
   the folded first section (16) is subsequently folded in U-shape, and
   a second section (18) adjacent to the first section (16) is rolled around the folded first section (16) while retaining the folded U-shape of the first section.

2. The method according to claim 1, wherein the folded first section (16) is forced into an oblong slit (30) in a tool by a folding knife (32) and is thus folded in U-shape.

3. The method according to claim 2, wherein the second section (18) is wound around the first section (16) and the folding strip (28) and the folding strip (28) is removed after rolling up the second section (18).

4. The method according to claim 1, wherein the folded first section (16) is introduced into an oblong folding strip (28), which is especially U-shaped in cross-section and has a slit (30) extending in the longitudinal direction, and thus is folded in U-shape.

5. The method according to claim 1, wherein the second section (18) is rolled completely around the first section (16) at least once.

6. The method according to claim 1, wherein the second section (18) is rolled completely around the first section (16) at least three times.

7. The method according to claim 1, wherein a cross-sectional shape of the first section folded in U-shape defines the shape of the folded side airbag.

8. The method according to claim 1, wherein the rolling core is round in cross-section.

9. The method according to claim 1, wherein the first border is opposed to the fastening section.

10. The method according to claim 1, wherein the second section is rolled completely around the first section at least three times.

11. An airbag which protects the heads of the front and/or rear occupant comprising flat fabric which is folded by a method according to claim 1, wherein the first section (16) has plural nested fabric layers (20) each of which extends and is folded in U-shape, and wherein the second section (18) is rolled around the first section (16).

12. The side airbag according to claim 11, wherein the second section (18) is rolled with at least one fabric layer (24) completely around the first section (16).

13. The side airbag according to claim 11, wherein the second section (18) includes at least three fabric layers (24) rolled on top of each other.

14. The side airbag according to claim 11, wherein the first section (16) has at least three nested fabric layers (20) extending in U-shape.

15. The side airbag according to claim 11, wherein directly superimposed fabric layers (20) of the first section (16) are merging at a common border (22) of a U.

* * * * *

UNITED STATES PATENT AND TRADEMARK OFFICE
CERTIFICATE OF CORRECTION

PATENT NO. : 9,896,057 B2
APPLICATION NO. : 14/898843
DATED : February 20, 2018
INVENTOR(S) : Anton Fischer It is certified that error appears in the above-identified patent and that said Letters Patent is hereby corrected as shown below:

In the Claims

Column 5, Line 45 reads "and first border" should read --and a first border--

Signed and Sealed this
Third Day of April, 2018

Andrei Iancu
*Director of the United States Patent and Trademark Office*